United States Patent [19]

Li et al.

[11] Patent Number: 5,684,531
[45] Date of Patent: Nov. 4, 1997

[54] RANGING APPARATUS AND METHOD IMPLEMENTING STEREO VISION SYSTEM

[75] Inventors: Larry C. Li, Sugarland; Brian J. Cox, Seabrook, both of Tex.

[73] Assignee: The United States of America as represented by the Administrator of the National Aeronautics and Space Administration, Washington, D.C.

[21] Appl. No.: 425,002

[22] Filed: Apr. 10, 1995

[51] Int. Cl.⁶ .................................. H04N 7/18; H04N 9/47
[52] U.S. Cl. .......................... 348/139; 348/119; 382/106; 382/153
[58] Field of Search .................................. 348/139, 113, 348/114, 115, 116, 118, 119, 140, 142; 901/47; 369/106, 121; 356/3.14, 3.15, 3.08; 382/106, 153, 154; H04N 7/18, 9/47

[56] References Cited

U.S. PATENT DOCUMENTS

| | | | |
|---|---|---|---|
| 4,969,735 | 11/1990 | Gilligan | 356/4 |
| 4,979,815 | 12/1990 | Tsikos | 356/1 |
| 5,040,116 | 8/1991 | Evans, Jr. et al. | 364/424.02 |
| 5,109,345 | 4/1992 | Dabney et al. | 364/459 |
| 5,109,425 | 4/1992 | Lawton | 382/1 |
| 5,130,794 | 7/1992 | Ritchey | 358/87 |
| 5,168,141 | 12/1992 | Tashjian et al. | 219/121.63 |
| 5,175,616 | 12/1992 | Milgram | 358/88 |
| 5,216,476 | 6/1993 | Lanckton | 356/2 |
| 5,320,538 | 6/1994 | Baum | 434/307 |
| 5,331,413 | 7/1994 | Diner | 348/159 |
| 5,420,828 | 5/1995 | Geiger | 367/131 |
| 5,495,576 | 2/1996 | Ritchey | 395/125 |
| 5,510,625 | 4/1996 | Pryor et al. | 250/559 |
| 5,526,022 | 6/1996 | Donahue et al. | 345/156 |

*Primary Examiner*—Andrew Faile
*Assistant Examiner*—Vincent F. Boccio
*Attorney, Agent, or Firm*—James M. Cate

[57] ABSTRACT

A laser-directed ranging system for use in telerobotics applications and other applications involving physically handicapped individuals. The ranging system includes a left and right video camera mounted on a camera platform, and a remotely positioned operator. The position of the camera platform is controlled by three servo motors to orient the roll axis, pitch axis and yaw axis of the video cameras, based upon an operator input such as head motion. A laser is provided between the left and right video camera and is directed by the user to point to a target device. The images produced by the left and right video cameras are processed to eliminate all background images except for the spot created by the laser. This processing is performed by creating a digital image of the target prior to illumination by the laser, and then eliminating common pixels from the subsequent digital image which includes the laser spot. The horizontal disparity between the two processed images is calculated for use in a stereometric ranging analysis from which range is determined.

37 Claims, 6 Drawing Sheets

RANGING APPARATUS AND METHOD IMPLEMENTING STEREO VISION SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The present invention relates generally to systems for determining the range of an object from a reference point, and more particularly to ranging systems useful in robotic and other applications, such as surveying, production lines, and the like. Still more particularly, the present invention relates to laser-directed ranging systems useful in telerobotics applications.

Ranging techniques are generally classified into one of two major categories—either active or passive. Active ranging techniques are those that actively engage the target by introducing an effect not already a part of the local environment, as for example, by electromagnetic radiation, sonic waves, or a laser beam. One common active ranging technique is based on "time-of-flight" detection, in which the transmission time of a radiated energy signal (electromagnetic, sonic, or ultrasonic radiation) to and from the target is measured and the range thereby calculated.

A second common active ranging technique relies on phase-shift detection in a reflected signal. Sometimes called the Moire method, one amplitude-modulated spatial signal (e.g., reflected light from a scene) is multiplied by another amplitude-modulated spatial signal (e.g., a viewing grating) to create an output signal with surface depth information encoded as a phase difference.

In holographic interferometry, a third active ranging technique, coherent light from two separate laser beams, focused at a common surface point, is added and the surface depth is encoded in the detected phase difference.

Triangulation ranging techniques actively measure two interior angles, angle AB and angle BC, and the baseline B of a triangle ABC and then determine the length A or C from the viewing apparatus to the target surface. Basically, either the ambient light reflected from the target surface may be viewed from two angles, on opposite ends of the baseline, or light may be projected onto the target surface from one end of the baseline and viewed or detected from the opposite end of the baseline.

Passive ranging techniques measure the distance between a target and a fixed reference point on the basis of information derived from the target without illuminating or irradiating the target. Stadimetry, for example, determines the distance to a target from the known height of a target feature and the size of that feature within the image (i.e., the angle subtended by that target feature in the viewed image). This technique requires that the size of the target feature be known in order to calculate the target range.

Another passive ranging technique is that employed by the traditional parallax range finder. In this technique, the target is viewed from two optical apertures. When the lines of sight of the two apertures are parallel, two images are observed. By varying the angle of one viewing aperture, coincidence of the images is effected and angular variation of the one viewing aperture is a measure of target range.

Figure 1:
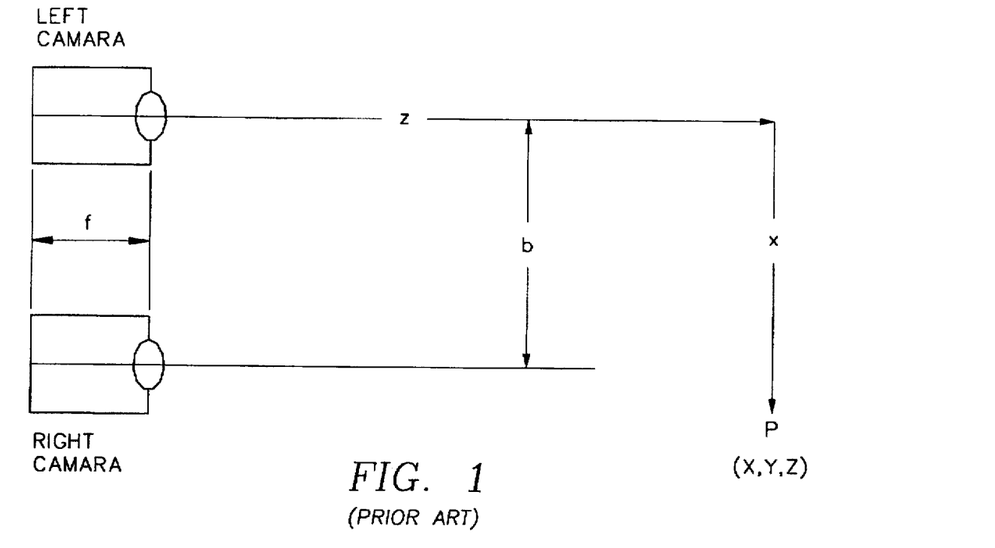
FIG. 1 is a diagram that demonstrates the prior art technique of stereometric ranging.

Stereometric ranging is yet another passive ranging technique utilizing a stereoscopic image pair to deduce the three-dimensional characteristics of a target. In stereoscopic imaging, a pair of cameras are arranged as shown in FIG. 1, with the line-of-sight of the two cameras parallel, lying in the horizontal plane, and separated by distance, b. The normal range, z, from the front of the left camera lens to the vertical plane defined by a point, p, is calculated as follows:

$$z = \frac{fb}{x_l - x_r}$$

where f is the focal length of the two cameras, and $x_l$ and $x_r$ are the horizontal coordinates of the image of point, p, in the left and right camera images, respectively. The difference $(x_l - x_r)$ is sometimes referred to as the "disparity."

Telerobotics is a collection of technologies that enable a human operator to control a robot at a remote site. A suitable ranging technique is an essential element of telerobotics applications to enable the remote operator to direct a robot manipulator to a particular position to effect a particular operation relative to a target. Many of the conventional ranging techniques are not suitable for telerobotics applications. Relatively inexpensive radar or sonar ranging instruments are incapable of reliably and consistently discriminating range in environments that include a number of objects having differing size and specular reflection characteristics. More accurate time-of-flight instruments are expensive. Laser and other phase change detectors also are quite expensive and are bulky and consume large amounts of power.

As for passive ranging techniques, stadimetry, requiring advance knowledge of the height of a target, is not suitable for real-time telerobotics applications. Accordingly, most telerobotics applications utilize some form of parallax or stereometric ranging. These techniques, however, require for their success a high-contrast environment for enhanced accuracy and significant computational power, because the entire field of view of the camera images must be processed to identify the target within the image and to compute either the point of coincidence (for parallax ranging) or the disparity (for stereometric ranging). The computations typically involve large numbers of convolution and cross-correlation algorithms and result in a majority of time being spent processing unwanted range information. Because of the complex algorithms, these techniques are not suitable for real-time applications without using expensive, high-speed computers.

Hence, it would be advantageous to develop a ranging technique suitable for use in real time telerobotic applications that does not require the processing of complex algorithms and thus does not require the use of expensive, high-speed computers.

SUMMARY OF THE INVENTION

Accordingly, there is provided herein a laser directed ranging system, adapted for telerobotics applications, in which a frame grabbing system connected to stereo video cameras, and a processor operating in accordance with a disparity measurement algorithm, are operable for determining the range to a localized area or spot within the field of view of the cameras which is illuminated by a directional light source, preferably a laser in the visible or infrared range, such as a laser diode ruby red laser source, in fixed alignment with the cameras.

The video cameras are mounted on a camera platform which can be positioned remotely by an operator. In the preferred embodiment, position and orientation sensors are provided to determine head movements of the operator, and to produce electrical signals indicative thereof. The electrical signals indicative of the operator's head movements are provided to the camera platform to position the platform accordingly.

Once the video cameras are positioned properly, the operator activates a laser, or other directional light source, to produce a spot on the target device. The processor then shuts off the laser momentarily so that a left and right video image of the target device can be obtained without the laser spot. The laser then is turned on and a second set of left and right video images are taken of the target device with the laser spot. The video images are digitized for further processing.

The processor next generates a left and right image of the laser spot by eliminating common pixels between the respective image of the target device without the spot and the respective image of the target device with the spot. The processor then determines the disparity between the left and right image of the laser spot. This disparity value then is used to determine the range to the target device in a stereometric ranging process. After the range to the target device is determined, the processor can position a robotics arm to manipulate the target device as desired.

BRIEF DESCRIPTION OF THE DRAWINGS

For a more detailed description of the preferred embodiment of the invention, reference will now be made to the accompanying drawings, wherein.

DESCRIPTION OF THE PREFERRED EMBODIMENT

Of the many different active and passive ranging techniques currently available, none are particularly well suited to real time telerobotic applications. Inexpensive active ranging systems, such as radar and sonar systems, are not sufficiently discriminatory and accurate for telerobotic applications. More accurate "time-of-flight" and phase change type active ranging systems are expensive and typically too bulky for telerobotic applications. Passive techniques such as stereometric ranging require high contrast environments and significant computational power to operate on a real-time basis. The present invention solves these problems by providing an improved stereometric ranging system in which a low-power laser is used to superimpose a high contrast image on the target and thereby to enable the elimination of unnecessary processing of background images surrounding the illuminated spot on the target.

Figure 2:
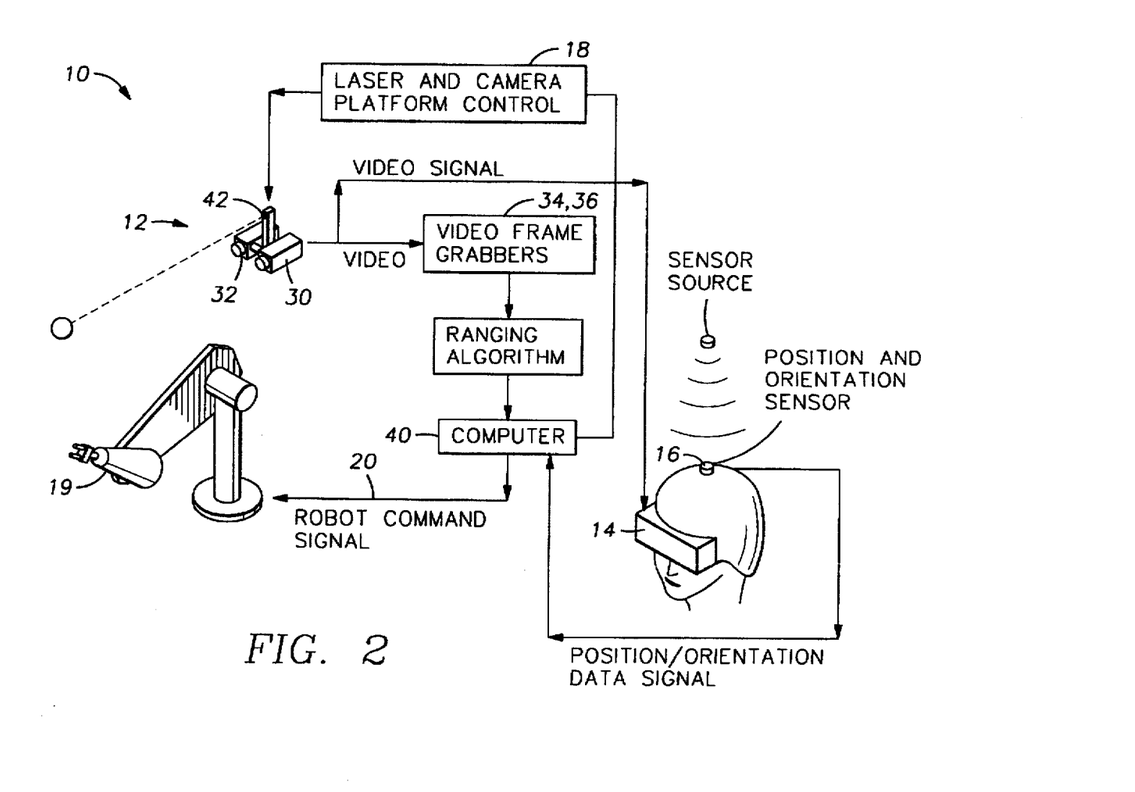
FIG. 2 is a functional block diagram depicting a laser-directed ranging system constructed in accordance with the principles of the present invention.

Referring now to FIG. 2, a laser-directed ranging system 10 constructed in accordance with the principles of the present invention includes a stereo camera imaging and ranging system 12, a head-mounted display system 14, a position and orientation sensor system 16, a laser/camera platform control system 18, and a robot control system 20.

A. General Apparatus and Method of Operation

Referring still to FIG. 2, the ranging system 10 is designed to permit an operator to control a robot 19 at a remote location with head motions and voice commands. The stereo camera imaging and ranging system 12, which is located at a location remote to the operator, captures visual images of the remote location. The visual images are conveyed electronically to the operator and provide real time feedback to the operator's head-mounted display system 14, whereby the operator can observe and direct the robot.

A laser 42 or other direction light source preferably mounts between the two cameras 30 in the stereo camera imaging and ranging system 12. In the preferred embodiment, the laser 42 aligns in a parallel plane with the video cameras 30. One skilled in the art will immediately realize, however, that the laser 42 may be offset with respect to the video cameras, so long as the laser spot hits and is reflected off the target. The laser 42 enables the operator to illuminate a target. The video images, both laser-illuminated and not, are captured from the stereo cameras 30 in conventional frame grabber circuitry 34 and are used in a computer-based ranging algorithm to identify the position of a target relative to the position of the robot 19.

The position and orientation sensor system 16 connects to the operator's helmet and monitors the position and orientation of the operator's head. The position and orientation data is delivered to the laser/camera platform control system 18, which adjusts the position and orientation of the laser and cameras in conformance with the operator's head movements.

In the preferred operation, the operator turns on the laser 42 by voice command and points the laser at the robot target by appropriate head movements. When the laser is properly targeted, the operator commands the system to identify the range to the target and commands the robot to engage the target as desired. In the sections that follow, the components preferably comprising the ranging system 10 are identified and their interrelationship and operation are explained in detail.

B. Stereo Camera Imaging and Ranging System

Figure 3:
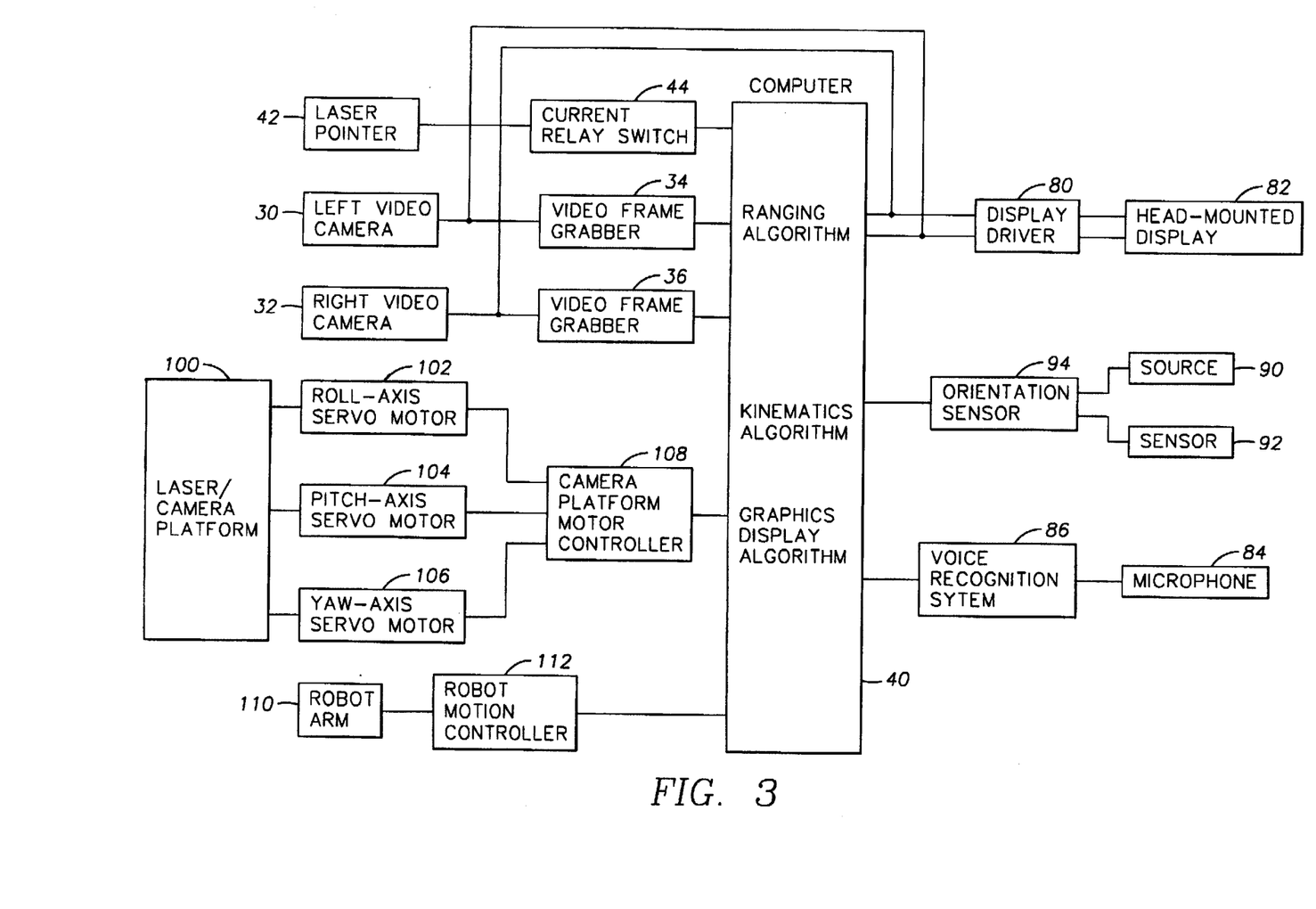
FIG. 3 is a more detailed block diagram showing the components comprising the laser-directed ranging system depicted in FIG. 2 and their interrelationship.

Referring now to FIG. 3, the stereo camera imaging and ranging system 12 comprises left and right video cameras 30, 32, each connected through conventional video frame grabber boards 34, 36 to a general purpose computer 40, such as a personal computer or workstation, and a laser pointer 42 connected to the computer 40 through a current relay switch 44.

The video cameras 30, 32 preferably are high quality color video cameras having an image discrimination capability sufficient for the desired application of the ranging system, preferably with automatic gain control. One suitable camera type is the Model TMC-50 manufactured by Pulnix. The video cameras 30, 32 are mounted with their lines of sight preferably in parallel alignment on a platform, which is described more particularly below in the section entitled, "Laser/Camera Platform Control System."

The left and right camera, 30, 32 are connected to the conventional video frame grabber boards 34, 36, which are received in slots in the chassis of the computer 40. For example, the inventors have used Datacube MaxVideo 20 frame grabber boards with success in such a telerobotics application. The frame grabber boards capture a video image on command, digitize the image, and store the digitized image or transmit it on command to the computer 40. The computer 40 may be any microprocessor-based computer capable of executing the control and analysis algorithms described herein, including, for example, Model No. Sparc 2 workstation manufactured by Sun Microsystems, Inc.

The laser 42 preferably is a low power laser, such as a 1 mW, class II ruby laser diode, which is relatively inexpensive and safe for human operating environments. A ranging algorithm, as described below, is executed by the computer 40 and sets and resets a digital I/O bit to activate and deactivate the conventional current relay switch 44, which energizes and deenergizes the laser 42, all as is well known to persons having ordinary skill in the art of designing and implementing real time computer control systems.

C. The Ranging Algorithm

Applicants have devised a novel ranging algorithm that combines the use of a laser with conventional stereometric ranging theory to provide a ranging system that does not require processing of large numbers of convolution and cross-correlation algorithms. As a result, Applicant's ranging algorithm can be used in real-time telerobotics applications without a computer having enhanced processing capabilities.

Figure 4:
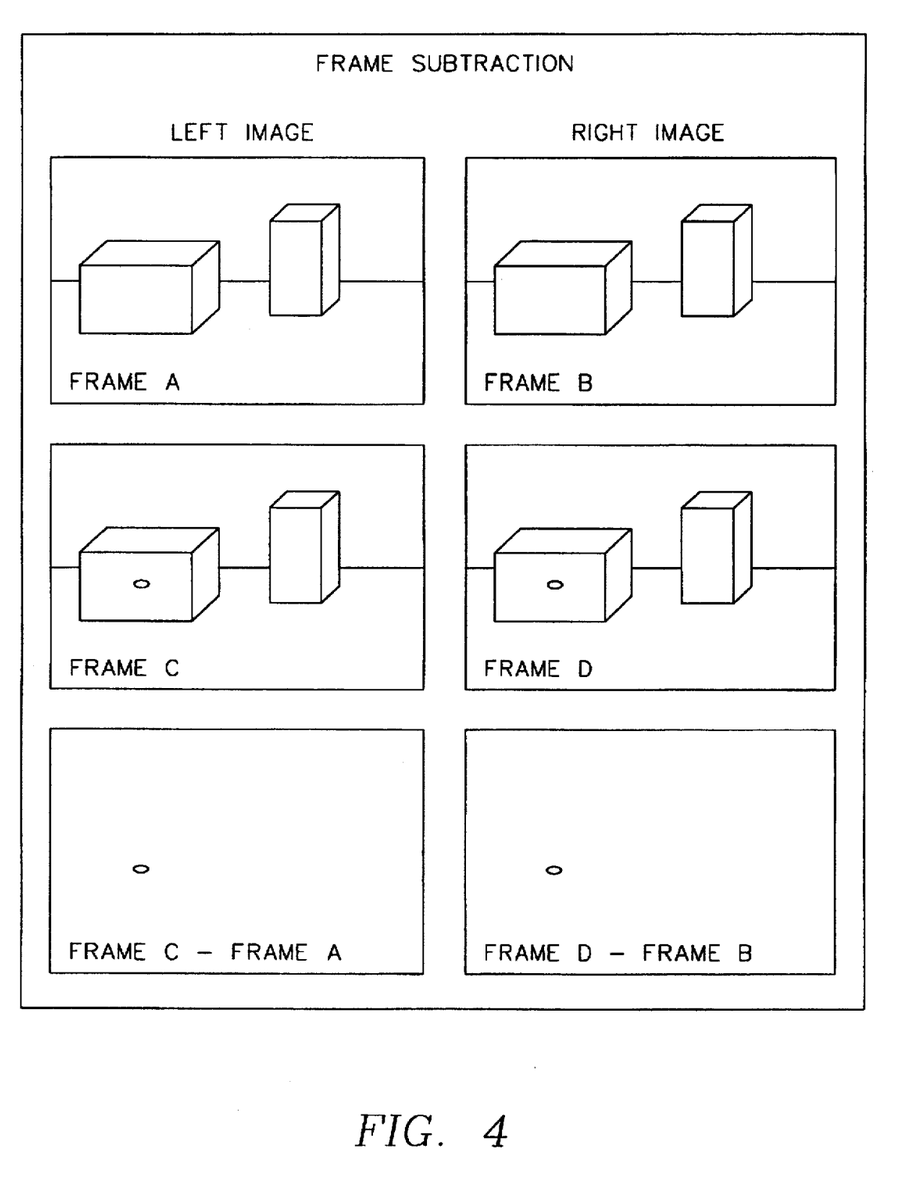
FIG. 4 depicts successive images from the stereo cameras shown in FIG. 2 to illustrate the frame subtraction technique of the present invention.

A sequence of video images for both the left and right cameras 30, 32, as shown in FIG. 4, will aid in understanding Applicants' novel ranging algorithm. Referring now to FIGS. 3 and 4, Frame A and Frame B show representative images from the left and right cameras, respectively. Frames C and D represent images of the same scene from the two cameras, with the target box illuminated by the laser 42. Frames A and C are digitized and stored by the frame grabber board 34 for the left camera 30, as Frames B and D are digitized and stored by the frame grabber board 36 for the right camera 32.

The computer 40 then compares Frame A with Frame C and creates a third image in which the common pixels from both frames are eliminated, leaving only the spot created by the laser illumination. In effect, the image of Frame A is subtracted from the image of Frame C. The same process is applied to Frames B and D to create an image of the laser spot from the right camera. The horizontal disparity between the spots in the two images can then be calculated, and the range to the target box can be calculated by conventional stereometric ranging analysis.

Figure 5:
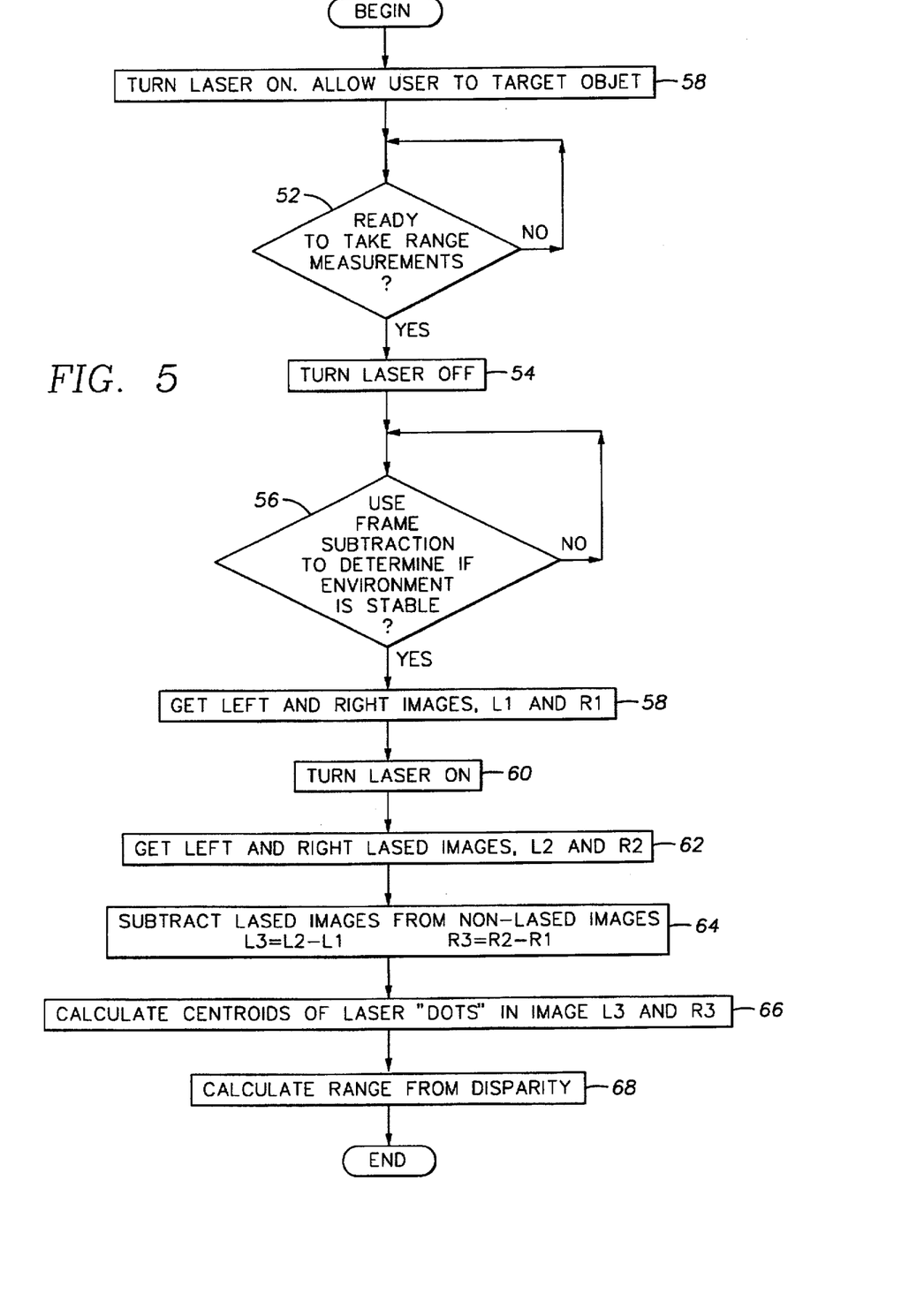
FIG. 5 is a flow chart describing the ranging algorithm executed by the computer shown in FIG. 2.

Referring now to FIG. 5 for a more particular description of the ranging algorithm, the process begins by activating the laser in step 50. This can be initiated by a conventional manual switch connected to the computer or by the operator's oral command, which is translated through a voice recognition system forming a part of the computer. Other techniques for activating the laser also can be used without departing from the principles of the present invention.

In step 52, the algorithm waits for an indication from the operator that the operator is ready to take a range measurement. Upon receiving the operator's command to take a range measurement, the algorithm turns off the laser (step 54) and then determines whether the camera is stable enough to execute the ranging measurement (step 56). This is accomplished, for example, by executing successive frame subtractions until the resulting difference for both cameras is a blank image for a predetermined length of time.

When the camera is sufficiently steady, the algorithm then executes the frame subtraction routine as described above in connection with FIG. 4. Thus, each of the two frame grabber boards capture an image of the target (step 58), the laser is turned on (step 60), each of the two frame grabber boards capture an image of the target as illuminated by the laser (step 62), and the computer subtracts the non-illuminated image from the corresponding illuminated image to create a pair of images of the laser spot (step 64).

Next, in step 66, the horizontal and vertical coordinates of the centroid of the laser spot in each of the two images can be calculated from the following formulas:

$$X = \frac{1}{N} \sum_{n=1}^{N} x_n$$

$$Y = \frac{1}{N} \sum_{n=1}^{N} y_n$$

where, N represents the number of pixels comprising the laser spot after frame subtraction, and $(x_n, y_n)$ are the coordinates of these pixels in the image. If the video cameras are positioned in a common vertical plane, there will be no disparity in the vertical plane, so that only horizontal disparity need be determined. If the cameras are not in a common vertical plane, then vertical disparity also must be determined.

The horizontal disparity and the range to the target are calculated in step 68. The horizontal disparity, d, which preferably is measured in pixels, is calculated as follows:

$$d = x_l - x_r$$

where $x_l$ is the horizontal coordinate of the centroid of the laser spot as viewed through the left camera, and $x_r$ is the horizontal coordinate of the centroid of the laser spot as viewed through the right camera.

The normal range, z, to the target then can be calculated as follows:

$$z = \frac{fb}{d}$$

where f is the focal length of the two cameras, and b is the baseline separation between the lines of sight of the parallel cameras.

For improved accuracy, it may desirable to calibrate the range measurement empirically by determining the disparity, as described above, for a plurality of known ranges. Thus, one can set up the cameras with a target positioned on the centerline between the two cameras, move the cameras along the centerline to a plurality of predetermined target ranges, measuring the disparity at each range, generate a curve depicting range versus disparity, and apply a functional approximation technique, such as a least squares algorithm, to define the range as a function of disparity for the particular camera arrangement in use. The robotic arm can be used to move the target along the camera centerline for calibration through the implementation of a kinematics algorithm, which moves the robotic arm in Cartesian space in a "linear fashion". A Kinematics algorithm typically is provided with a commercial robotics system such as the type PUMA 560 robotics manipulator manufactured by Staübli.

Figure 6:
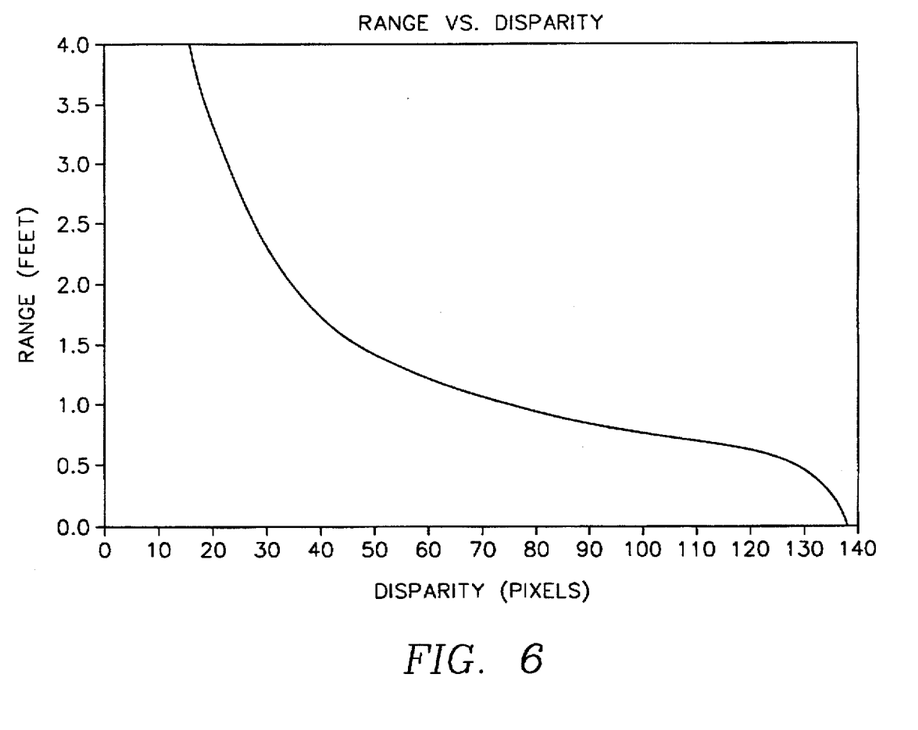
FIG. 6 is a typical graph of the relationship between the stereometric image disparity and the range for the ranging system depicted in FIG. 2.
Figure 7:
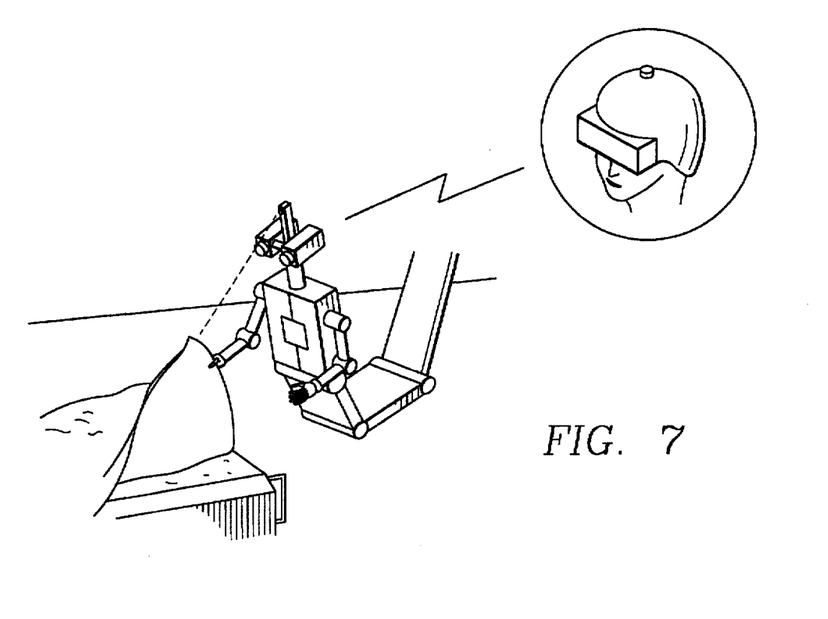
FIG. 7 is a perspective drawing illustrating a robotics application for the ranging system of the present invention.

FIG. 6 depicts a typical curve for an empirical measurement of the range versus disparity curve. If range is to be determined from an empirical calibration of the cameras, step 68 of the ranging algorithm (FIG. 5) becomes, instead of a calculation as indicated above, a table look-up of range from measured disparity, or a calculation of range from disparity using the function that fits the empirically measured curve.

D. Head-Mounted Display System

Referring briefly to FIG. 2, the head-mounted display system 14 provides the operator with video feedback of the environment at the remote location. Referring now to FIG. 3, the stereo video signals generated by the stereo cameras 30, 32 are channeled to the computer 40, which executes a graphics algorithm to generate an artificial video image. The video image then is transmitted by the computer 40 to a display driver 80, which activates a helmet-like device 82 with two display screens, each fed from one of the video channels, that depict the remote scene to the operator. Alternatively, the video image from the stereo cameras may be transmitted to the head-mounted display without use of a graphics generated image. In either case, the necessary software and equipment, may be purchased commercially. One such suitable display system is the Flight Helmet manufactured by Virtual Research.

The preferred embodiment of the present invention also includes a microphone 84, which is physically attached to the helmet 82 and coupled through a voice recognition system 86 to the computer 40. The microphone and voice recognition system enable the operator to execute control operations (turn on laser, find range to target, move robot to target, etc.) without using hands or feet. This feature is particularly critical in an application of the invention for the benefit of an operator who is required to use his hands for other tasks, or for the benefit of handicapped persons, as described more particularly below. A commercially available voice recognition system suitable for the present application is the DS400 manufactured by Speech Systems, Inc. The voice command system is operable for generating digital data messages within the computer that are sent to servo-mechanisms which position the robotic arm as instructed, in accordance with techniques known in the art.

E. Position and Orientation Sensor System

Referring briefly to FIG. 2, the position and orientation sensor system 16 detects the position and orientation of the operator's head and communicates the information to the computer, as will be described in greater detail, which in turn communicates the information to the laser/camera platform control system 18. In this manner, the position and orientation sensor system 16 enables the stereo cameras and attached laser at a remote location to mimic movements of the operator's head.

Referring now to FIG. 3, the position and orientation sensor system includes a source 90, for generating a position sensor and orientation magnetic field in the region of the head-mounted display helmet 82 and a position and orientation sensor 92 mounted on the helmet 82 for generating electrical signals representative of position and orientation of the helmet within the magnetic field generated by the source 90. In the preferred embodiment, a Polhemus "Fast Trak" sensor is used as the position and orientation sensor 92. The system further includes an interface unit 94 that receives electrical signals from the sensor 92 and generates digital position data (x, y, z) and digital orientation data (roll, pitch, yaw) that is communicated to the computer 40.

The position and orientation sensor system described herein is available commercially. Products suitable for use in this application include the FastTrack systems manufactured by Polhemus or The Bird manufactured by Ascension Device.

F. Laser/Camera Platform Control System

Referring briefly to FIG. 2, the laser/camera platform control system 18 is a positioning apparatus for moving the stereo cameras and the laser relative in response to motion of the operator's head at a remote location. Referring now to FIG. 3, the laser/camera platform control system 18 comprises a mechanical platform support structure 100, a roll-axis servo motor 102, a pitch-axis servo motor 104, a yaw-axis servo motor 106, and a motor controller 108.

In the preferred embodiment, the stereo cameras 30, 32 are affixed to the platform 100 in such a manner that the lines of sight of the two cameras are parallel. The laser diode 42 is also affixed to the platform 100 and aligned such that its beam projects along a line that is parallel to the lines of sight of the stereo cameras 30, 32. The beam of the laser diode 42 need not lie along a line that is co-planar with the lines of sight of the stereo cameras 30, 32.

The platform 100 has three degrees-of-freedom motion capability, with each degree-of-freedom driven by one of the three servo motors 102, 104, 106. The three motors 102, 104, 106 are controlled by the motor controller 108, which receives orientation position commands from the computer 40. The computer 4D receives data reflecting the position (x, y, z) and orientation (roll, pitch, yaw) of the operator's head, as described above in the section entitled, "Position and Orientation Sensor System," and transforms the orientation data into a set of orientation angles (roll, pitch, yaw) that are communicated to the motor controller 108.

The servo motors 102, 104, 106 preferably comprise DC-servo motors, such as the type 2842-024C motor manufactured by MicroMo. The motor controller may be, for example, a type LM629 controller manufactured by National Semiconductor, Inc.

G. Robot Control System

In the preferred embodiment, the robot 19 (FIG. 2), comprises the output device for the telerobotic application of the present invention, and the robot arm selected for use in connection with the present invention may vary from one application to the next. Referring now to FIG. 3, the robot control system typically includes a robot arm 110, comprising one or more sections, and a robot motion controller 112, and a kinematics algorithm executed by the computer 40.

Referring still to FIG. 2, the robot arm 110 preferably includes an end effector, such as a mechanical hand 111 for accomplishing the purposes of the robot arm. One goal of the present invention is to enable the system 10 to command the end effector on the robot arm 110 to a precise position that corresponds to the position of the target object. The computer 40 defines the Cartesian coordinates of a position command based on information ascertained through the ranging algorithm, as described above. Using the kinematics algorithm, the computer 40 computes the motion controller commands needed to move the end effector on the robot arm 110 to the target position. The commands are communicated by the computer 40 to the motion controller 112, which in turn controls the motors that move the robot arm 110. One robot arm suitable for telerobotics applications is the type PUMA 560 manipulator manufactured by Staübli.

H. General Operating Procedure of the Preferred Embodiment

Referring still to FIG. 3, a typical operating procedure involves the operator wearing the head-mounted display 82, with the orientation sensor 92 attached above the helmet, and the microphone 84 positioned near the mouth. The sensor system source 90 preferably is mounted on a fixture attached to the floor. The sensor 92 on the helmet will measure the orientation of the operator's head relative to the source's reference frame to define a position for the sensor 92 in three dimensional space. The operator can change the position of the sensor 92 by turning or changing the elevation of his or her head. This head movement, therefore, is analogous to the manipulation of a joystick. The orientation sensor system outputs data to the computer 40, preferably via a RS232 serial link. The operator's head orientation is then transformed through the kinematics algorithm of the stereo camera platform 108 to obtain joint commands that will move the laser/camera platform 100 to the same orientation relative to the robot's own reference frame, in accordance with conventional techniques. The joint commands are sent to the laser/camera platform motor controller 108 via a parallel or RS232 port.

To acquire the range information of a visual target selected by the operator, the operator can simply point the laser 42 at the target. The reflected laser "dot" can be "seen" by both the frame grabbers 34, 36 as well as the operator. The frame grabbers 34, 36 capture the video images and digitize them. The digital images are stored in memory and transmitted to the computer 40 for processing. Through the frame subtraction technique, the laser "dot" is isolated in each of the left and right images. The computer 40 then finds the centroid of the laser "dot" in the left and right images according to the method of FIG. 5, as discussed above. The computer 40 preferably uses the x-axis disparity between the two centroids to calculate the range of the target using the ranging algorithm.

Because the orientation of the laser/camera platform 100 and the range of the target are now known, the target's Cartesian position relative to the laser/camera platform 100 can be determined. Once the Cartesian position of the target is known, the robot arm 110 can be commanded to move to that location by voice command via the microphone 84. Once the operator has completed the manipulation of the target object, the laser range finding system can be deactivated by voice command.

I. Alternative Embodiment

Figure 8:
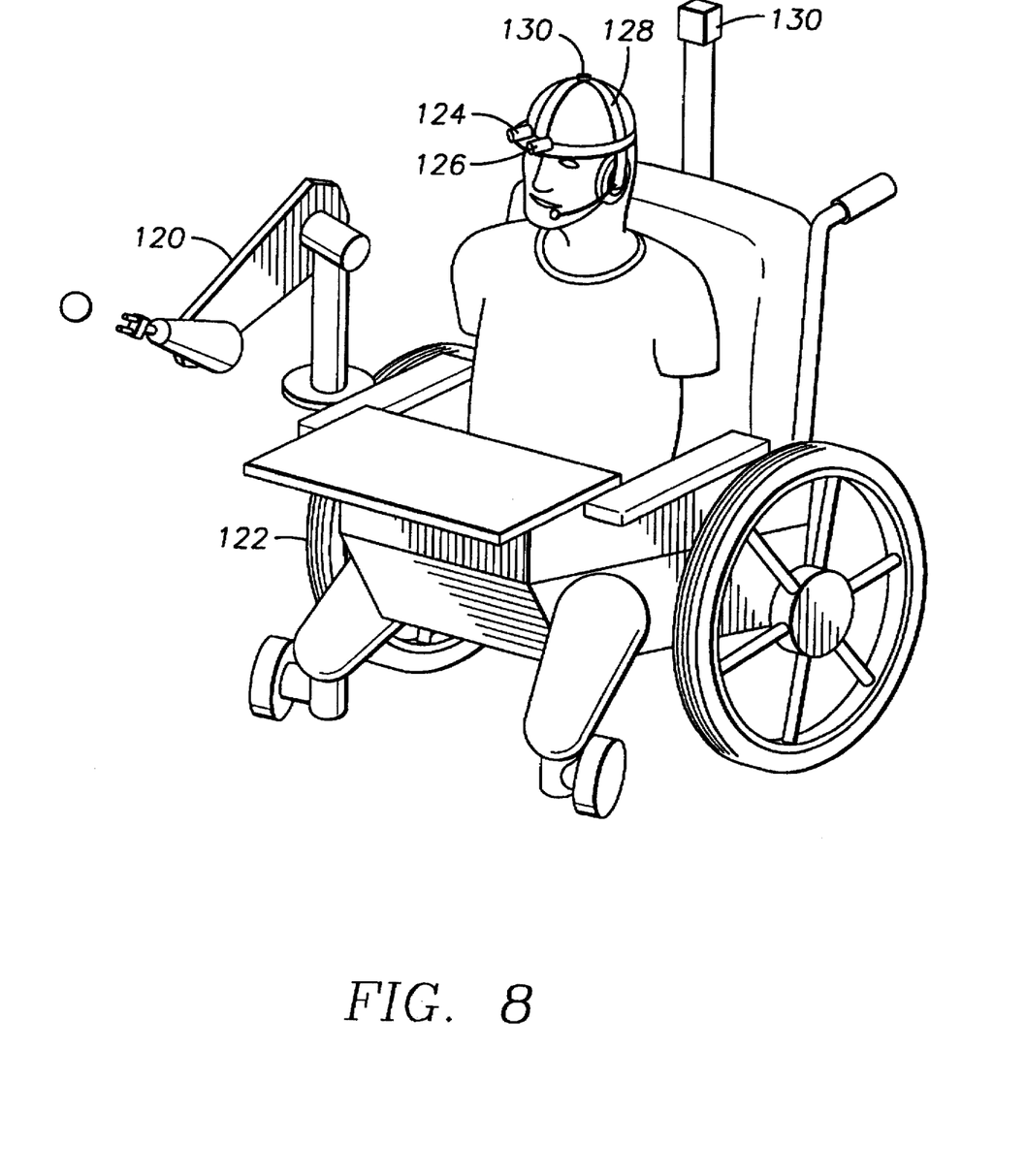
FIG. 8 is a perspective drawing illustrating an application for the present invention involving robotics assistance to handicapped individuals.

The present invention can also be used in applications involving operators who must operate other controls, or who cannot devote full attention to the robot controller, or who are physically handicapped. Referring to FIG. 8, a robot arm 120 can be mounted on a support structure adjacent a workpiece. In the exemplary embodiment of FIG. 8, the support structure comprises a wheelchair 122, and the operator can use the alternative embodiment of the invention to identify the target location so that the robot can grasp or manipulate the target object based on the voice commands given by the user.

In the alternative embodiment of the invention, illustrated in FIG. 8, the stereoscopic cameras 124 and laser 126 are mounted on a helmet 128 worn by the operator along with the magnetic direction/position sensors 130. This embodiment eliminates the need for a laser/camera platform control system because the camera and laser will be moved into position locally by the operator's head movements instead of remotely.

The present invention allows the operator to specify the target of interest virtually hands-free. The hands-free method of target selection is more user-friendly to physically handicapped persons than those methods that require some form of manual pointing. As in the first embodiment, computation is limited by using the frame subtraction algorithm with the laser illuminated image and the non-laser illuminated image. This reduces the memory/computer size and power necessary to perform the computation, as well as allowing the algorithm to run faster than others on a given processor.

While a preferred embodiment of the invention has been shown and described, modifications thereof can be made by one skilled in the art without departing from the spirit of the invention.

We claim:

1. A ranging system for telerobotics applications, comprising:
   a first video camera;
   a second video camera spaced from said first video camera, said first and said second video cameras being located in a common plane;
   a directional light source positioned relative to said first and said second video cameras for illuminating a portion of a selected target during selected periods;
   capture means, associated with said video cameras, for capturing a first set of stereoscopic images of the target while said directional light source is illuminating a portion of the target, and for capturing a second set of stereoscopic images of the target while said directional light source is not illuminating a portion of the target, and means for generating a third set of stereoscopic images of the target eliminating common elements of the first and second set of images;
   a robotic device; and
   a processor electrically associated with said capture means and said robotics device, said processor including a ranging algorithm for determining the range to said target based upon remaining elements in the third set of stereoscopic images.

2. A system as in claim 1, wherein said video cameras are mounted on a camera platform.

3. A system as in claim 2, wherein said camera platform is electrically coupled to said processor, further comprising a position and orientation sensor coupled to said processor, and wherein said processor positions said camera platform based upon electrical signals generated by said position and orientation sensor.

4. A system as in claim 3, wherein said position and orientation sensor comprises means for generating signals indicative of the movement of an operator's head.

5. A system as in claim 4, wherein the operator is positioned remotely from said video cameras.

6. A system as in claim 1, wherein said directional light source is activated by an operator remote from said light source.

7. A system as in claim 1, wherein said light source is activated by a physically handicapped person.

8. A system as in claim 1, wherein said directional light source illuminates a spot on said target.

9. A system as in claim 8, wherein said means for capturing a first set of stereoscopic images of the target while said directional light source is illuminating a portion of a selected target, and for capturing a second set of stereoscopic images of the target while said directional light source is not illuminating a portion of the selected target include first and second frame grabbers associated with said first and second video cameras, respectively, and wherein said first frame grabber generates a first image of said target with said spot, and said second frame grabber generates a second image of said target with said spot, and said processor determines the disparity in said plane between the position of the spot in said first image and the position of the spot in said second image.

10. A system as in claim 1, wherein said first frame grabber is electrically coupled to said first video camera, and said second frame grabber is electrically coupled to said second video camera, and wherein the output signals from said first and said second frame grabbers are provided as input signals to said processor.

11. A system as in claim 5, further comprising a remote display for said operator, said display receiving images from said video cameras through said processor.

12. A system as in claim 1, wherein said directional light source is positioned in the same plane as said video cameras.

13. A system as in claim 1, wherein said processor determines the disparity in said plane between the illuminated image of said first camera and the illuminated image of said second camera.

14. A system as in claim 1, wherein said video cameras lie in a horizontal plane with respect to each other, for determining horizontal disparity.

15. A system as in claim 1, wherein said light source comprises a laser.

16. An apparatus for determining range to a target, comprising:
 a directional light source operable to selectively illuminate a portion of a target to selectively create an illuminated spot on said target;
 a first video camera for capturing a first digital image of said spot;
 a second video camera for capturing a second digital image of said spot; and
 a computer operably associated with said first video camera and said second video camera for determining the range to said target by comparing said first and said digital images to determine disparity, wherein the range is determined from a look-up table for the determined disparity value.

17. An apparatus as in claim 16, wherein said computer obtains the stereoscopic digital images of said spot by eliminating common pixels between an image of said target without said spot and an image of said target with said spot.

18. An apparatus as in claim 17, wherein said directional light source is a laser and wherein said computer turns off and on said laser.

19. An apparatus as in claim 18, further comprising a means for directing the directional light source on said target.

20. An apparatus as in claim 19, wherein said video cameras are mounted on a platform, and said platform is positioned by an operator to obtain said images.

21. An apparatus as in claim 20, comprising means for positioning the platform in response to head movement of the operator.

22. An apparatus as in claim 21, further including an operator display receiving images from said video cameras.

23. An apparatus as in claim 22, including a head mounted unit, and wherein said operator display is provided in said head-mounted unit.

24. An apparatus as in claim 23, further comprising a robotics device connected to said computer, wherein said operator activates said robotics device and said computer provides an electrical signal indicative of target location to said robotics device.

25. An apparatus as in claim 24, wherein said robotics device is activated by a voice command from the operator.

26. An apparatus as in claim 25, further comprising a voice recognition system connected to said computer, said voice recognition system comprising means for converting said voice command to an electrical output signal.

27. A method for determining range to a target, comprising the steps of:
 (a) capturing a first set of stereoscopic images of a target;
 (b) activating a directional light source for illuminating a portion of said target;
 (c) capturing a second set of stereoscopic images of the target while the light source is directed onto the portion of said target;
 (d) generating a third set of stereoscopic images of the target by eliminating common elements of the first and second set of images; and
 (e) determining range to the target based upon remaining elements in the third set of stereoscopic images.

28. A method as in claim 27, wherein the range to the target is determined by calculating the disparity between the remaining elements of the third set of stereoscopic images.

29. A method as in claim 27, wherein said stereoscopic images includes a left video image and a right video image.

30. A method as in claim 29, wherein said video images are digitized.

31. A method for remotely controlling a robotics device to manipulate a target device, comprising the steps of:
 (a) remotely viewing the target device;
 (b) capturing a left and a right video image of said target device;
 (c) activating a light source to generate a spot on said target device;
 (d) capturing a left and a right video image of said target device with said spot thereon;
 (e) eliminating common pixels between said video images captured in step (b) and said video images captured in step (d) to obtain a left and right image of said spot;
 (f) determining disparity between said left and right image obtained in step (e);
 (g) calculating range to said target device based upon said disparity determination;
 (h) positioning said robotics device to contact said target device based upon said range calculation.

32. A method as in claim 31, wherein the step of remotely viewing the target device includes positioning a left and right video camera to view the target device.

33. A method as in claim 32, wherein the positioning of said left and right cameras is performed by moving the head of an operator.

34. A method as in claim 31, wherein the video images are captured by a left and right frame grabber circuit.

35. A method as in claim 31, wherein said laser is positioned by an operator and activated by said operator.

36. A method as in claim 31, wherein said laser is activated by a computer after said target device is selected by an operator.

37. An apparatus for determining range to a target, comprising:
 a directional light source for illuminating a portion of a selected target during selected periods;
 means including first and second video cameras for capturing a first set of stereoscopic images of the target while said directional light source is illuminating a portion of a selected target, and for capturing a second set of stereoscopic images of the target while said directional light source is not illuminating a portion of the selected target, and for generating a third set of stereoscopic images, of the illuminated portion of the target, by eliminating common elements of the first and second set of images;
 a computer operably associated with said first and second video cameras and said robotics device for determining the range to said target by comparing the positions of the illuminated portion of the target within said third set of images, based upon elements remaining in the third set of stereoscopic images and with common elements in said first and second sets of stereoscopic images eliminated, to determine disparity.

* * * * *